US010298504B2

(12) United States Patent
Ertugay et al.

(10) Patent No.: US 10,298,504 B2
(45) Date of Patent: *May 21, 2019

(54) ADAPTIVE GAIN REDUCTION FOR BACKGROUND CONNECTIONS

(71) Applicant: Microsoft Technology Licensing, LLC, Redmond, WA (US)

(72) Inventors: Osman N. Ertugay, Bellevue, WA (US); Christian Huitema, Clyde Hill, WA (US); Praveen Balasubramanian, Redmond, WA (US); Daniel Havey, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 140 days.

This patent is subject to a terminal disclaimer.

(21) Appl. No.: 15/277,873

(22) Filed: Sep. 27, 2016

(65) Prior Publication Data
US 2017/0324668 A1 Nov. 9, 2017

Related U.S. Application Data

(60) Provisional application No. 62/331,926, filed on May 4, 2016.

(51) Int. Cl.
*H04L 12/825* (2013.01)
*H04L 12/801* (2013.01)
(Continued)

(52) U.S. Cl.
CPC ............ *H04L 47/25* (2013.01); *H04L 1/0002* (2013.01); *H04L 1/0015* (2013.01); *H04L 47/10* (2013.01); *H04L 47/283* (2013.01)

(58) Field of Classification Search
CPC ..... H04L 47/25; H04L 1/0002; H04L 1/0015; H04L 47/10; H04L 47/283
See application file for complete search history.

(56) References Cited

U.S. PATENT DOCUMENTS 6,038,216 A 3/2000 Packer
7,502,860 B1 3/2009 Champagne
(Continued)

OTHER PUBLICATIONS

Shalunov, Low Extra Delay Background Transport (Year: 2012).*
(Continued)

*Primary Examiner* — Brandon M Renner
*Assistant Examiner* — Jay L Vogel
(74) *Attorney, Agent, or Firm* — Newport IP, LLC; Scott Y. Shigeta

(57) ABSTRACT

The technologies disclosed herein provide improvements to the Low Extra Delay Background Transport (LEDBAT) protocol. Some aspects of the present disclosure introduce an adaptive congestion window gain for background connections. In some configurations, a gain value for influencing the transmission rate of a background connection is dynamically adjusted based on data indicating a round trip time (RTT). The RTT includes a sum of a time in which the data is communicated to a remote device and a time in which acknowledgement is data returned from the remote device. In some configurations, the gain is decreased when the RTT is below a threshold and the gain is increased when the RTT is above the threshold. Among other features, the present disclosure also provides techniques involving a modified slow-start, multiplicative decrease and periodic slowdowns. The features disclosed herein mitigate some existing issues, such as latency drift, inter-LEDBAT fairness, and unnecessary slowdowns.

20 Claims, 4 Drawing Sheets

(51) Int. Cl.
*H04L 1/00* (2006.01)
*H04L 12/841* (2013.01)

(56) References Cited

U.S. PATENT DOCUMENTS

| | | | |
|---|---|---|---|
| 7,706,260 | B2 | 4/2010 | Cohen et al. |
| 7,821,937 | B1 | 10/2010 | Guo |
| 8,099,492 | B2 | 1/2012 | Dahlin et al. |
| 8,340,099 | B2 | 12/2012 | Black et al. |
| 8,793,361 | B1 | 7/2014 | Riddle |
| 9,559,972 | B2 | 1/2017 | Zhao |
| 2002/0181494 | A1 | 12/2002 | Rhee |
| 2005/0013245 | A1 | 1/2005 | Sreemanthula |
| 2005/0036511 | A1 | 2/2005 | Baratakke et al. |
| 2005/0094751 | A1* | 5/2005 | Serizawa ............... H03G 5/005 375/346 |
| 2005/0122995 | A1 | 6/2005 | Meyer et al. |
| 2009/0073975 | A1 | 3/2009 | Shimonishi |
| 2009/0147676 | A1 | 6/2009 | Shimonishi |
| 2009/0304007 | A1* | 12/2009 | Tanaka ................ H04L 12/4645 370/395.53 |
| 2011/0199186 | A1* | 8/2011 | Han .................. G06K 19/07741 340/10.1 |
| 2012/0017121 | A1 | 1/2012 | Carlson et al. |
| 2014/0192639 | A1* | 7/2014 | Smirnov ................. H04L 47/10 370/230 |
| 2015/0003245 | A1 | 1/2015 | Pressley |
| 2015/0213756 | A1 | 7/2015 | Wacyk |
| 2017/0085420 | A1* | 3/2017 | Singh .................. H04L 41/0803 |
| 2017/0324641 | A1* | 11/2017 | Ertugay ................ H04L 5/0055 |

OTHER PUBLICATIONS

PCT/US2017/029734—International Search Report and Written Opinion, dated Jul. 31, 2017, 15 pages.
PCT/US2017/030332—International Search Report and Written Opinion, dated Jul. 31, 2017, 15 pages.
"International Search Report and Written Opinion Issued in PCT Application No. PCT/US2017/029735", dated Aug. 1, 2017, 12 Pages.
Abu, et al., "A framework for dynamically selecting gain in LEDBAT algorithm for high speed network", In Information Technology Journal, vol. 10, Issue 2, Retrieved on: Apr. 7, 2016, pp. 358-366.
Mirzaei, et al., "Adjustable, Delay-based Congestion Control in a Reliable Transport Protocol over UDP", In Master of Science Thesis of KTH Royal Institute of Technology, Retrieved on: Apr. 7, 2016, 59 pages.
Venkataramani, et al., "TCP Nice: A Mechanism for Background Transfers", In Proceedings of 5th Symposium on Operating Systems Design and Implementation, Dec. 9, 2002, 15 pages.
Priya J., et al., "Application of Newton Raphson Algorithm for Optimizing Transmission Control Protocol Performance", In Journal of Computer Science, vol. 9, Issue 5, Jan. 2013, pp. 566-571.
Reale, et al., "DTL: Dynamic Transport Library for Peer-To-Peer Applications", In Proceedings of 13th International Conference on Distributed Computing and Networking, Jan. 3, 2012, pp. 1-15.
Abu, et al., "A Dynamic Algorithm for Stabilising LEDBAT Congestion Window", In Proceedings of Second International Conference on Computer and Network Technology, Apr. 23, 2010, pp. 157-161.
Adhari, et al., "Eclipse: A New Dynamic Delay-based Congestion Control Algorithm for Background Traffic", In Proceedings of 18th International Conference on Network-Based Information Systems, Sep. 2, 2015, 9 pages.
Komnios, et al., "LEDBAT Performance in Sub-packet Regimes", In Proceedings of 11th Annual Conference on Wireless On-demand Network Systems and Services, Apr. 2, 2014, 8 pages.
Rossi, et al., "Yes, we LEDBAT: Playing with the new BitTorrent congestion control algorithm", In Proceedings of 11th International Conference on Passive and Active Measurement, Apr. 7, 2010, 10 pages.
Kühlewind, et al., "Erratum: Evaluation of Different Decrease Schemes for LEDBAT Congestion Control", In Proceedings of 17th International Workshop on Energy-Aware Communications, Sep. 5, 2011, pp. 108-119.
Trang, et al., "On the Existence of Optimal LEDBAT Parameters", In Proceedings of IEEE International Conference on Communications, Jun. 10, 2014, 7 pages.
Key, et al., "Network Aware Applications: A Background Transfer Service", In Proceedings of Forty-First Allerton Conference on Communication, Control, and Computing, Oct. 1, 2003, 10 pages.
Abu, et al., "Impact of Delay Variability on LEDBAT Performance", In Proceedings of IEEE International Conference on Advanced Information Networking and Applications, Mar. 22, 2011, pp. 708-715.
"Low Extra Delay Background Transport (ledbat)", Retrieved on: Apr. 15, 2016, 4 pages Available at: https://datatracker.ietf.org/wg/ledbat/charter/.
Welzl, et al., "A Survey of Lower-than-Best-Effort Transport Protocols", Published on: Jun. 2011, 18 pages Available at: https://www.rfc-editor.org/rfc/pdfrfc/rfc6297.txt.pdf.
Shalunov, et al., "Low Extra Delay Background Transport (LEDBAT)", Published on: Dec. 2012, 25 pages Available at: https://www.rfc-editor.org/rfc/pdfrfc/rfc6817.txt.pdf.
Shalunov, et al., "Design Space for a Bulk Transport Tool", In Journal of Internet2 Bulk Transport Working Group Technical Report, May 2005, pp. 1-14.
Carofiglio, et al., "The quest for LEDBAT fairness", In Proceedings of IEEE Global Communications Conference, Dec. 6, 2010, 6 pages.
Carofiglio, et al., "Rethinking the Low Extra Delay Background Transport (LEDBAT) Protocol", In Journal of Computer Networks, vol. 57, Issue 8, Jun. 4, 2013, pp. 1-28.
Chu, et al., "Increasing TCP's Initial Window", Published on: Apr. 2013, 24 pages Available at: https://tools.ietf.org/pdf/rfc6928.pdf.
"About BITS", Retrieved on: Apr. 15, 2016, 1 page Available at: https://msdn.microsoft.com/en-us/library/aa362708(v=vs.85).aspx.
"Understanding Delay in Packet Voice Networks", In White Paper of Cisco, Apr. 15, 2016, 18 pages.
Carofiglio, et al., "Rethinking low extra delay background transport protocols", In Journal of Computing Research Repository, Oct. 2010, 9 pages.
"libutp", Retrieved on: Apr. 15, 2016, 2 pages Available at: https://github.com/bittorrent/libutp.
"Trust Legal Provisions (TLP)", Retrieved on: Apr. 15, 2016, 2 pages Available at: http://trustee.ietf.org/trust-legal-provisions.html.
Ha, et al., "Taming the Elephants: New TCP Slow Start", 14 pages.
"Non Final Office Action Issued in U.S. Appl. No. 15/331,778", dated Aug. 10, 2018, 26 pages.

* cited by examiner

ADAPTIVE GAIN REDUCTION FOR BACKGROUND CONNECTIONS

CROSS REFERENCE TO RELATED APPLICATION

This patent application claims the benefit of U.S. Provisional Patent Application Ser. No. 62/331,926, filed May 4, 2016, and entitled "ENHANCED BACKGROUND CONNECTIONS," which is hereby incorporated in its entirety by reference.

BACKGROUND

Some operating systems use background connections for a number of various tasks, such as software updates, telemetry, and error reporting. In some cases, background connections can compete with regular connections and affect the user experience. In such scenarios, it may appear that a network is not responsive, or a user application, such as a videoconferencing program, can have difficulty establishing a quality connection. To address such issues, the Low Extra Delay Background Transport (LEDBAT) congestion control algorithm provides solutions to optimize background connections.

Although the LEDBAT protocol can help in some scenarios, some aspects of the LEDBAT protocol may not improve the user experience. In fact, some aspects of the LEDBAT protocol may cause issues. For instance, the reliance on one-way measurements can cause issues. The latecomer advantage and the lack of fairness between LEDBAT connections can also be an issue. Also, latency drift can raise issues. Such issues can lead to, among many other problems, saturated connections and unnecessary slowdowns.

It is with respect to these and other considerations that the disclosure made herein is presented.

SUMMARY

The techniques described herein provide improvements to the LEDBAT standard. The techniques described herein address some aspects of the above-described issues by introducing an adaptive congestion window gain for background connections. In some configurations, a gain value for controlling the transmission rate of a background connection is dynamically adjusted based on data indicating a round trip time. As packets of data are sent to a remote computing device, acknowledgement data associated with the sent packets is returned. The acknowledgement data indicates a round trip time, which includes a sum of a time in which the data is communicated to the remote device and a time in which the acknowledgement data is returned from the remote device. In some configurations, when the round trip time is below a threshold, the gain value is reduced. When the round trip time is above or equal to a threshold, the gain value is increased. Among other features, the present disclosure also provides techniques involving a modified slow start and periodic slowdowns. The features disclosed herein mitigate some of the issues with the LEDBAT protocol, such as latency drift, inter-LEDBAT fairness, and unnecessary slowdowns.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
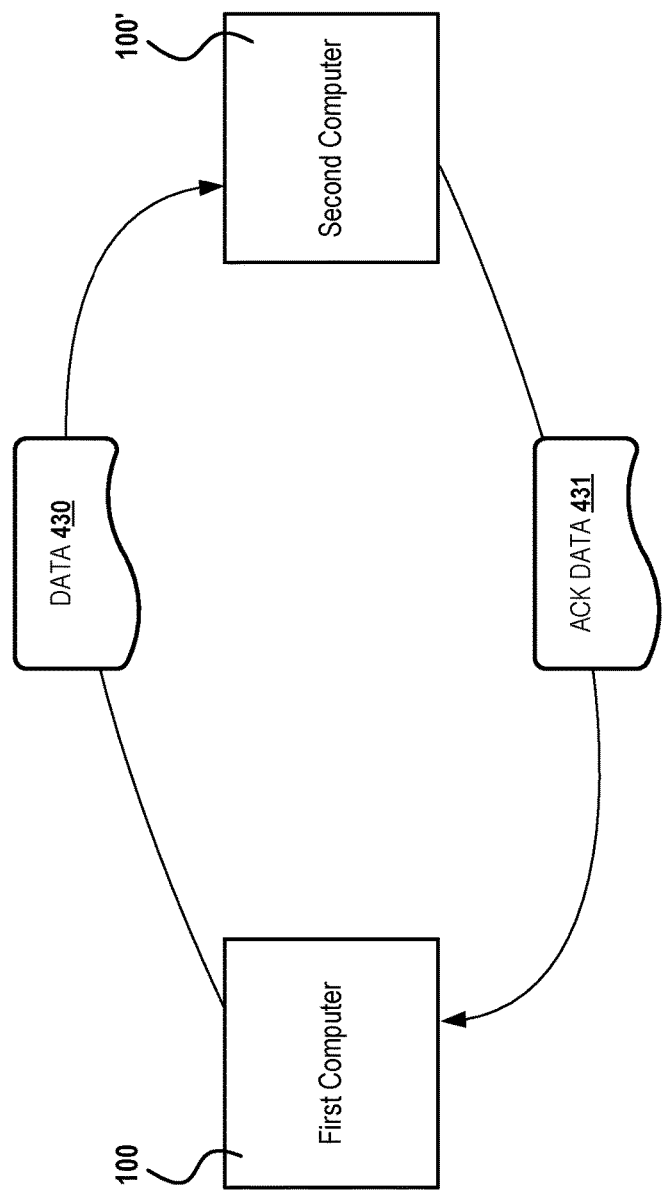
FIG. 1 is a diagram showing attributes of a scenario consequential of a system enabling adaptive gain control for background connections.

The Detailed Description discloses improvements to the LEDBAT standard. Some of the techniques disclosed herein address some aspects of the above-described issues by introducing an adaptive congestion window gain for background connections. In some configurations, a gain value is dynamically adjusted based, at least in part, on data indicating a round trip time. The round trip time indicates a sum of a time in which the data is communicated to a remote device and a time in which acknowledgement data is returned from the remote device. In some configurations, when the round trip time is below a threshold, the gain value is reduced. When the round trip time is above or equal to a threshold, the gain value is increased. Among other features, the present disclosure also provides techniques involving a modified slow-start and periodic slowdowns. The features disclosed herein mitigate some of the issues with the LEDBAT protocol, such as latency drift, inter-LEDBAT fairness, and unnecessary slowdowns.

In one illustrative example, a method comprises communicating packets of data from a first computing device to a second computing device. The first computer can receive acknowledgement data indicating a round trip time of individual packets of data. The round trip time indicates a sum of the time in which a packet of the data is communicated from the first computing device to the second computing device and the time in which the acknowledgement data associated with the packet is communicated from the second computing device to the first computing device. The method also comprises determining a gain value when the round trip time meets a criterion. For instance, if the round trip time is below a threshold, the gain value can be modified to reduce a communication rate, and if the round trip time is above or equal to a threshold, the gain value can be modified to increase a communication rate.

For illustrative purposes, consider an example where the data is communicated based on a current gain value. In this example, for illustrative purposes, the process of determining a gain value comprises reducing or increasing the current gain value to a new gain value. In some configurations, when the round trip time is below a threshold, the new gain value can be determined by reducing the current gain value. When the round trip time is above a threshold, a new gain value can be determined by increasing the current gain value. In some specific examples, the new gain value may be reduced to a value of, or approximate to, $1/16$ when the round trip time is below a threshold, and the new gain value may be increased to a value of, or approximate to, 1 (one) when the round trip time is above or at a threshold. The process may then involve the communication of additional data from the first computing device to the second computing device based, at least in part, on the new gain value.

As will be described in more detail below, in some configurations, a gain value can be reduced when a round trip time meets the criterion. The round trip time meets the criterion when the round trip time indicates a new minimum time. Some example parameters defining a new minimum time are provided in the LEDBAT standard. As will be described below, the techniques disclosed herein can also determine a window value based, at least in part, on the determined gain value. The window value defines a number of data packets that are in flight between the first computing device and the second computing device.

As a matter of background, the LEDBAT protocol is designed to minimize the impact of "lower than best effort" connections on the latency and bandwidth of other connections. To achieve that, each connection monitors the transmission delay of TCP packets, and compares them to the "minimum" delay observed on the connection. The difference between the transmission delay and the minimum delay is used as an estimate of the queuing delay. If the queuing delay is above a target, LEDBAT directs the connection to reduce its bandwidth. If the queuing delay is below the target, the connection is allowed to increase its transmission rate. The bandwidth increase and decrease are proportional to the difference between the observed values and the target. LEDBAT reacts to packet losses and explicit congestion notifications in the same way as standard TCP.

One-Way Delay Measurements

The LEDBAT algorithm uses one-way delay measurements. One issue with uses one-way delay measurements is that it can lead to unnecessary slowdowns, such as slowing down an upload connection because a download is saturating the downlink. To address such issues, using round trip measurements can be utilized.

Round trip measurements, referred to herein as a round trip time (RTT), can also include the delay at the receiver between receiving a packet and sending the corresponding acknowledgement. These delays are normally quite small, except when the "delayed acknowledgment" logic kicks in. These effects can be particularly acute when the congestion window only includes a few packets, for example at the beginning of the connection. The techniques disclosed herein mitigate these effects through a set of implementation features. First, some techniques enable the TCP Timestamp option, in order to obtain RTT samples with each acknowledgement. Then, some techniques filter the round trip measurements by using the minimum of the 4 most recent delay samples, as suggested in the LEDBAT specification. In addition, some techniques ensure that the queueing delay target (60 ms) is larger than an operating system's maximum acknowledgement delay (50 ms). This avoids over reacting to a single "delayed ACK" measurement.

In some configurations, the delay target of 60 ms is different from the 100 ms value recommended in the specification. In some scenarios, 100 ms can be too long, and may not allow for a threshold performance for voice over IP. The commonly quoted maximum acceptable one-way delay for voice communication can be 150 ms "from mouth to ear." Allowing 100 ms of queuing delay would consume $2/3$rd of that delay, leaving little room for the base delay, the compression delay, or other processing delays. In some configurations, a larger value than the acknowledgement delay can be selected, which is why 60 ms can be beneficial.

Latecomer Advantage

Delay based congestion control protocols like LEDBAT are known to suffer from a "latecomer advantage." When the newcomer establishes a connection, the transmission delay that it encounters incorporates queuing delay caused by the existing connections. The newcomer considers this large delay the minimum, and thus increases its transmission rate while other LEDBAT connections slow down. Eventually, the latecomer will end up using the entire bandwidth of the connection.

In some scenarios, the above-described issue can happen when LEDBAT competes with an established TCP connection. The TCP connection causes some queuing, the LEDBAT delay measurements incorporate that queuing, and the base delay is thus set to a larger value than the actual minimum. As a result, the queues remain mostly full. In some cases, this queuing persists even after the closing of the competing TCP connection.

LEDBAT does not offer features to mitigate the above-described issues. The designers of the protocol relied instead on the inherent burstiness of network traffic. Small gaps in transmission schedules allow the latecomer to measure the "true" delay of the connection. In some scenarios, this reasoning is not satisfactory because some target applications can upload large amount of data, and not every scenario experiences such gaps.

Inter-LEDBAT Fairness

The latecomer advantage is caused by the improper evaluation of the base delay, with the latecomer using a larger value than the preexisting connections. However, even when all competing connections have a correct evaluation of the base delay, we can still observe that some of them will receive a larger share of resource.

There are a number of reasons cause persistent unfairness. LEDBAT specifies proportional feedback based on a ratio between the measured queuing delay and a target. Proportional feedback uses both additive increases and additive decreases. This does stabilize the queue sizes, but it does not guarantee fair sharing between the competing connections.

Latency Drift

LEDBAT estimates the "base delay" of a connection as the minimum of all observed transmission delays over a 10-minute interval. It uses an interval rather than a measurement over the whole duration of the connection, because network conditions may change over time. For example, an existing connection may be transparently "rerouted" over a longer path, with a longer transmission delay. Keeping the old estimate would then cause LEDBAT to unnecessarily reduce the connection throughput.

Some existing systems can cause a ratcheting effect when LEDBAT connections are allowed to operate for a long time. The delay feedback in LEDBAT causes the queuing delay to stabilize just below the target. After an initial interval, all new measurements are thus equal to the initial transmission delay plus a fraction of the target. Every 10 minutes, the measured base delay increases by that fraction of the target queuing delay, leading to potentially large values over time.

Low Latency Competition

LEDBAT compares the observed queuing delays to a fixed target. The target value cannot be set too low, because that would cause poor operation on slow networks. In practice, it is set to 60 ms, a value that allows proper operation of latency sensitive applications like Voice over IP or remote desktop. But if the network connection is very fast, the queuing delays will never reach that target.

When the bandwidth is sufficiently large and the queuing delay never exceeds the target, the LEDBAT connection behaves just like an ordinary connection. It competes aggressively, and obtains the same share of the bandwidth as regular TCP connections.

With reference to FIG. 1, attributes of a scenario consequential of a system providing adaptive gain for background connections is shown and described below. In some configurations, a computer-implemented method can include communicating data 430 from a first computing device 100 to a second computing device 100'. The first computer 100 can receive acknowledgement data 431 indicating a round trip time, wherein the round trip time includes a time in which the data 430 is communicated from the first computing device 100 to the second computing device 100' and a time in which the acknowledgement data 431 is communicated from the second computing device 100' to the first computing device 100. One or more computers, such as the first computing device 100, can determine a gain value when the round trip time meets a criterion. The gain value can be based, at least in part, on the round trip time.

When the queuing delays are below the target delay, the standard version of LEDBAT is supposed to behave like the "New Reno" variant of TCP:

On packet loss: W−=W/2
On packet acknowledgement: W+=1/W

The above-described low latency competition problem can be solved by introducing a reduction factor F:

On packet loss: W−=W/2
On packet acknowledgement: W+=1/(F*W)

This reduction factor changes the equilibrium condition for TCP in presence of a packet drop rate "x":

TABLE 1

| Standard TCP equilibrium | With reduction factor |
|---|---|
| x*W/2 = 1/W | x*W/2 = 1/(F*W) |
| W = SQRT(2/x) | W = SQRT (2/(F*x)) |

When standard and reduced connections share the same bottleneck, they experience the same packet drop rate. The reduction factor ensures that the throughput of the LEDBAT connection will be a fraction (1/SQRT(F)) of the throughput of the regular connections. The LEDBAT specification introduces a "GAIN" coefficient that plays the same role as our reduction factor, if we defined GAIN=1/F.

In general, large values of F can work well when the base delay is small, and ensure that the LEDBAT connection will yield to regular connections in these networks. However, large values of F may not work well on long delay links. In the absence of competing traffic, combining large base delays with large reduction factors causes the connection bandwidth to remain well under capacity for a long time. In some configurations, the reduction factor F can be a function of the ratio between the base delay and the target delay:

F=min(16,CEIL(2*TARGET/base))

where "CEIL(X)" is defined as "the smallest integer larger than X." In some configurations, the reduction factor can be capped at 16. As 16 can provide a beneficial tradeoff between responsiveness and performance.

Multiplicative Decrease

Some existing systems include combining additive increases and multiplicative decreases in order to solve the Inter-LEDBAT fairness problem. Such techniques propose to change the way LEDBAT increase and decrease the congestion window based on the ratio between the observed delay and the target. Assuming that the congestion window is changed once per roundtrip measurement, the changes are summarized in the following table:

TABLE 2

| | Standard LEDBAT, per RTT | Multiplicative decrease, per RTT |
|---|---|---|
| Delay lower than target | W += Gain * (1 − delay/target) | W += Gain |
| Delay larger than target | W −= Gain * (delay/target − 1) | W += Gain − Constant * W * (delay/target − 1) |

In some scenarios, this change by itself may not suffice if the connections have different estimates of the base delay. In such conditions, that change alone may not solve the latecomer advantage.

In some configurations, the techniques disclosed herein adopted the constant value of 1 and capped the multiplicative decrease coefficient to be at least 0.5. Otherwise, spikes in delay can cause the window to immediately drop to its minimal value. In some configurations, the techniques disclosed herein can implement measures to ensure that the congestion window does not decrease below 2 packets. Such techniques may mitigate scenarios where the LEDBAT connection is starved.

Modified Slow Start

In some configurations, a computer-implemented method can include communicating data 430 from a first computing device 100 to a second computing device 100'. The rate in which packets of the data 430 are communicated from the first computing device 100 to the second computing device 100' can be increased. While increasing the rate, the first computing device 100 can monitor acknowledgement data 431 (ACK) indicating a RTT associated with individual packets. The RTT indicates a sum of a time in which the individual packet is communicated from the first computing device 100 to the second computing device 100' and a time in which the acknowledgement data is communicated from the second computing device 100' to the first computing device 100. One or more computers, such as the first computing device 100, can determine when the RTT meets or exceeds a threshold. An example threshold can be a predetermined fraction of a target, wherein the parameters defining a "target" is defined in the LEDBAT standard. In some configurations, the threshold can be a predetermined value within a range of 50% to 75% of a target. In some configurations, the threshold can be a predetermined value within a range of 50% to 80% of a target. In other illustrative examples, the threshold can be 60% of a target or the threshold can be 75% of a target. These examples can be approximately 60% of target or approximately 75% of target, wherein the term "approximately" can include a range of plus or minus 5 percentage points. Such examples enable a network connection to settle at a balanced communication rate, one in which considers a round trip time.

One or more computers, such as the first computing device 100, can then select a current rate associated with an individual packet in response to determining that the RTT for that individual packet meets or exceeds the threshold. Additional data 430 can then be communicated from the first computing device 100 to the second computing device 100' at the current rate.

In some configurations, one way to implement slow start is to apply the reduction factor F (as defined above) as the congestion window increases. In some configurations, the congestion window increases for every ACK by the amount of bytes acknowledged. In other words, the congestion window increases by a quantity of data indicated in the acknowledgement data 431. In some implementations, one technique involves increasing the congestion window by that number (a quantity of data) divided by the reduction factor F. In low latency links, this ensures that the connections ramp up slower than regular connections. In the same spirit, some configurations can also limit the initial window to 2 packets, while standard connections may use larger values, e.g., IW=10.

During the initial slow start, even with the reduction factor, the congestion window increases rapidly. In some configurations, the congestion window can double after each RTT until the excess traffic eventually causes queues to fill up and some packet to be lost. The techniques disclosed herein can avoid such issues by monitoring the transmission delays during the slow start period. In some configurations, when the queuing delay is larger than ¾ of the target delay, a system exits the slow start and starts a "congestion avoidance" phase. In the congestion avoidance, data is communicated at a selected rate as described above.

There is generally some noise in the measurement of delays, due for example to delayed acknowledgment mechanisms. The noise can cause an early exit of the initial slow start. This is acceptable in the initial slow start phase, because the alternative could be a large spike. However, after that initial slow start, the increase of congestion window is bounded by the "SSTRESH" (as defined in the LEDBAT standard) estimate acquired during congestion avoidance, and the risk of creating congestion spikes is very low. Thus, some configurations can apply the "exit on excessive delay" during the initial slow start.

Initial and Periodic Slowdown

In some configurations, a computer-implemented method can include communicating data 430 from a first computing device 100 to a second computing device 100'. The data 430 can be communicated in a slow start mode, wherein the slow start mode comprises increasing a rate in which packets of the data are communicated from the first computing device 100 to the second computing device 100', wherein the rate is increased from an initial rate. One or more computers, such as the first computing device 100, can determine that a packet of the data is lost. Once a packet is lost, the communication of data 430 can exit the slow start mode. After exiting the slow start mode, the one or more computers, such as the first computing device 100, can pause the communication of the data 430 from the first computing device 100 to the second computing device 100' for a predetermined time period, wherein the predetermined time period (T) is based, at least in part, on a round trip time associated with at least one individual packet of the data. In some configurations, the round trip time includes a time in which the at least one individual packet is communicated from the first computing device 100 to the second computing device 100' and a time in which acknowledgement data defining the round trip time is communicated from the second computing device 100' to the first computing device 10. After the pause, the computers can resume the communication of the data 430 from the first computing device 100 to the second computing device 100' at a predetermined rate for the predetermined time period (T). The predetermined rate can be any suitable rate depending on the available computing resources.

After communicating the data 430 at the predetermined rate for the predetermined time period, the computers can continue the communication of the data 430 from the first computing device 100 to the second computing device 100' in the slow start mode, wherein the slow start mode comprises increasing the rate in which packets of the data are communicated from the first computing device 100 to the second computing device 100', wherein the rate is increased from the initial rate.

The LEDBAT specification assumes that there will be natural gaps in traffic, and that during those gaps the observed delay corresponds to a state where the queues are empty. However, there may be cases where the traffic is sustained for long periods of time. Such scenarios may cause base delay estimates to be inaccurate and is one of the major reasons behind latency drift as well as the lack of inter-LEDBAT fairness. Some system cannot rely on packet losses to create gaps, because the delay-based congestion control keeps the queues small and the packet losses can be rare.

To ensure stability, the techniques disclosed herein can force these gaps, or "slow down periods." A "slowdown," as disclosed herein, is an interval during which the LEDBAT connection voluntarily reduces its traffic, allowing queues to drain and transmission delay measurements to converge to the base delay. The slowdown works as follow:

Upon entering slowdown, set "SSTRESH" to the current version of the congestion window CWND, and then reduce CWND to 2 packets.

Keep CWND frozen at 2 packets for 2 RTT, e.g., a time in which two round trips take between the first computing device 100 and the second computing device 100'. Other suitable time periods can also be utilized in this operation.

After 2 RTT, or another suitable time period, ramp up the congestion window according to the "slow start" algorithm, until the congestion window reaches SSTRESH. Keeping the CWND frozen at 2 packets for 2 RTT, or other suitable time periods, allows the queues to drain, and is helpful to obtaining accurate delay measurements.

In some configurations, the techniques disclosed herein can involve an "initial slowdown" followed by periodic slowdowns. The initial slowdown starts shortly after the connection completes the initial "slow start" phase, e.g., 2 RTT (or another suitable time period) after the initial slow start completes. Using such techniques, bottleneck queues are likely to drain, and the delay measurement can be more accurate.

In some configurations, periodic slowdowns can be performed after the initial slowdown. The interval between slowdown can be configured such that a slowdown does not cause more than a 10% drop in the utilization of the bottleneck. In some configurations, this can be achieved by measuring the duration of the slowdown, e.g., from the time of entry to the time at which the congestion window regrows to the previous SSTRESH value. The next slowdown is then scheduled to occur at 9 times this duration after the exit point.

The periodic slowdown can address the latency drift problem. The combination of initial and periodic slowdowns allows competing LEDBAT connections to obtain good estimates of the base delay, and when combined with multiplicative decrease solves both the latecomer advantage and the Inter-LEDBAT fairness problems.

Figure 2:
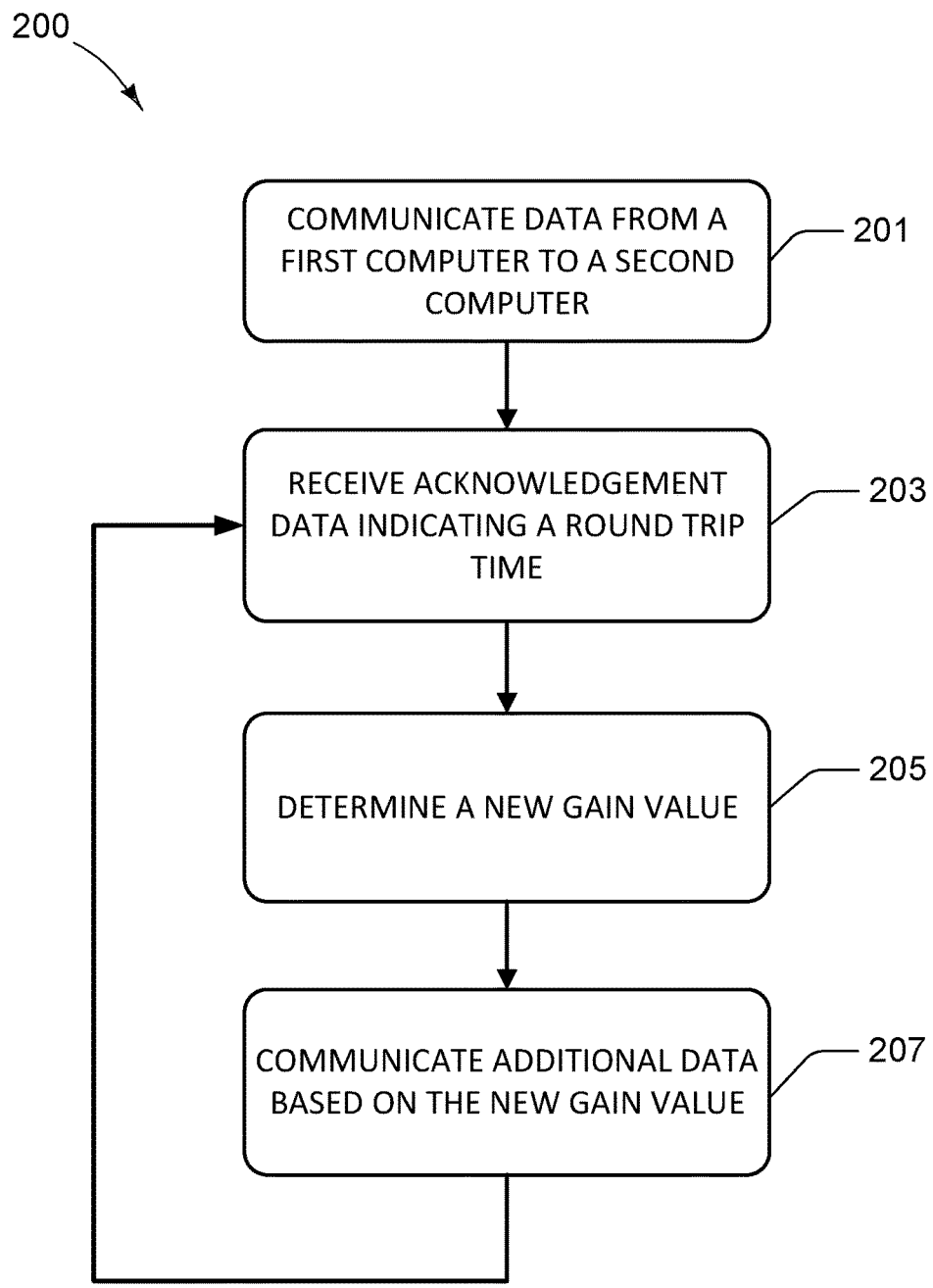
FIG. 2 illustrates aspects of a routine for enabling adaptive gain control for background connections.

Turning now to FIG. 2, aspects of a routine 200 for enabling adaptive gain for background connections is shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 200 are described herein as being implemented, at least in part, by a control module 409 and/or components or modules of an operating system 407 of a computing device 100. In some configurations, the control module 409 or another module running the features disclosed herein can be a dynamically linked library (DLL), a statically linked library, functionality caused by an application programing interface (API), a compiled program, an interpreted program, a script or any other executable set of instructions. Data 430, RTT data 431, which may include acknowledgment data indicating a round trip time, can be stored in a data structure in one or more memory components. The data 430 can comprise a plurality of packets 441, represented by a first packet 441A, a second packet 441B, and a third packet 441B. Data of any type can be retrieved from the data structure by addressing links or references to the data structure.

Although the following illustration refers to the components of the figures, it can be appreciated that the operations of the routine 200 may be also implemented in many other ways. For example, the routine 200 may be implemented, at least in part, by a processor of another remote computer 100' or a local circuit. In addition, one or more of the operations of the routine 200 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 2, the routine 200 begins at operation 201 where one or more modules cause a first computing device 100 to communicate data 430 to a second computing device 100'. The data 430 can include any type of data in any suitable format. For instance, the data 430 can include a packet of data for an update.

Next, at operation 203, the first computer 100 receives acknowledgement data 431 indicating a round trip time (RTT). The RTT indicates a sum of a time in which the data 430 is communicated from the first computing device 100 to the second computing device 100' and a time in which the acknowledgement data 431 is communicated from the second computing device 100' to the first computing device 100.

Next, at operation 205, one or more modules determine a new gain value for a connection between the first computing device 100 and the second computing device 100' based, at least in part, on the RTT. In some configurations, the gain value is modified when the round trip time meets a criterion. For instance, if the round trip time is below a threshold, the gain value can be modified to reduce a communication rate, and if the round trip time is above a threshold, the gain value can be modified to increase a communication rate.

In one example, the data 430 is communicated at a rate based on a current gain value. In the above example, when the round trip time is below a threshold, a new gain value can be determined by reducing the current gain value. When the round trip time is above a threshold, a new gain value can be determined by increasing the current gain value. In some specific examples, the new gain value may be reduced to a value approximate to or at $1/16$ when the round trip time is below a threshold, and the new gain value may be increased to, or approximate to, a value of 1 (one) when the round trip time is above or at a threshold. In some configurations, the threshold can be a minimum delay value. Sample parameters defining a minimum delay value are defined in the LEDBAT specification.

Next, at operation 207, additional data 430 is communicated from the first computing device 100 to the second computing device 100' based on the new gain value. Similar to operation 201, the additional data 430 can include any type of data in any suitable format.

The routine 200 then returns to operation 203 where the first computing device 100 receives subsequent acknowledgment data 431. The subsequent acknowledgment data 431 indicates a round trip time of the additional data 430 communicated in operation 207. Once the RTT of the additional data 430 is received, the routine can proceed to the following operations where a new gain value can be determined and additional data can be communicated utilizing the newly determined gain values. The routine 200 can proceed to loop through operation 203 through operation 207 to dynamically adjust the gain value, and a window value (window gain), of a background connection between the first computer 100 and the second computer 100'.

Figure 3:
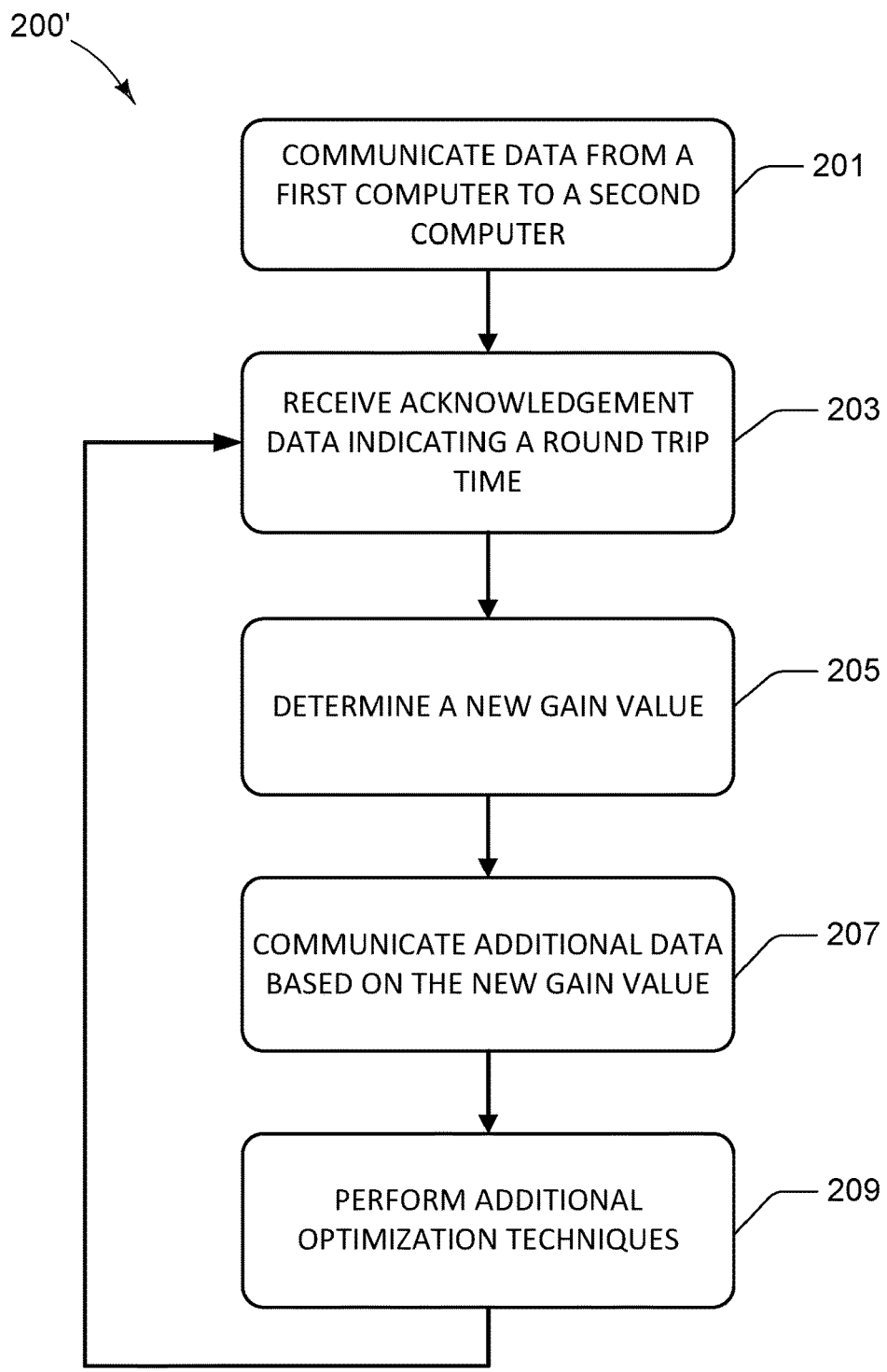
FIG. 3 illustrates aspects of a routine for enabling adaptive gain control in combination with other techniques for optimizing background connections.

Turning now to FIG. 3, aspects of a routine 200' for enabling adaptive gain in combination with other techniques for optimizing background connections is shown and described. Routine 200' is similar to the routine 200 illustrated in FIG. 2 in that operation 201 through operation 207 are configured in a manner as described above. Routine 200' also comprises operation 209 where additional adjustments can be made to a background connection. The additional adjustments can include other techniques, such as those involving a periodic slowdown or other disclosed techniques. In one illustrative example, operation 209 can pause the communication of data for a period of time, e.g., a 2× RTT, in response to detecting one or more predetermined conditions. This example is provided for illustrative purposes and is not to be construed as limiting. It can be appreciated that operation 209 can be positioned between other operations of the routine 200.

Figure 4:
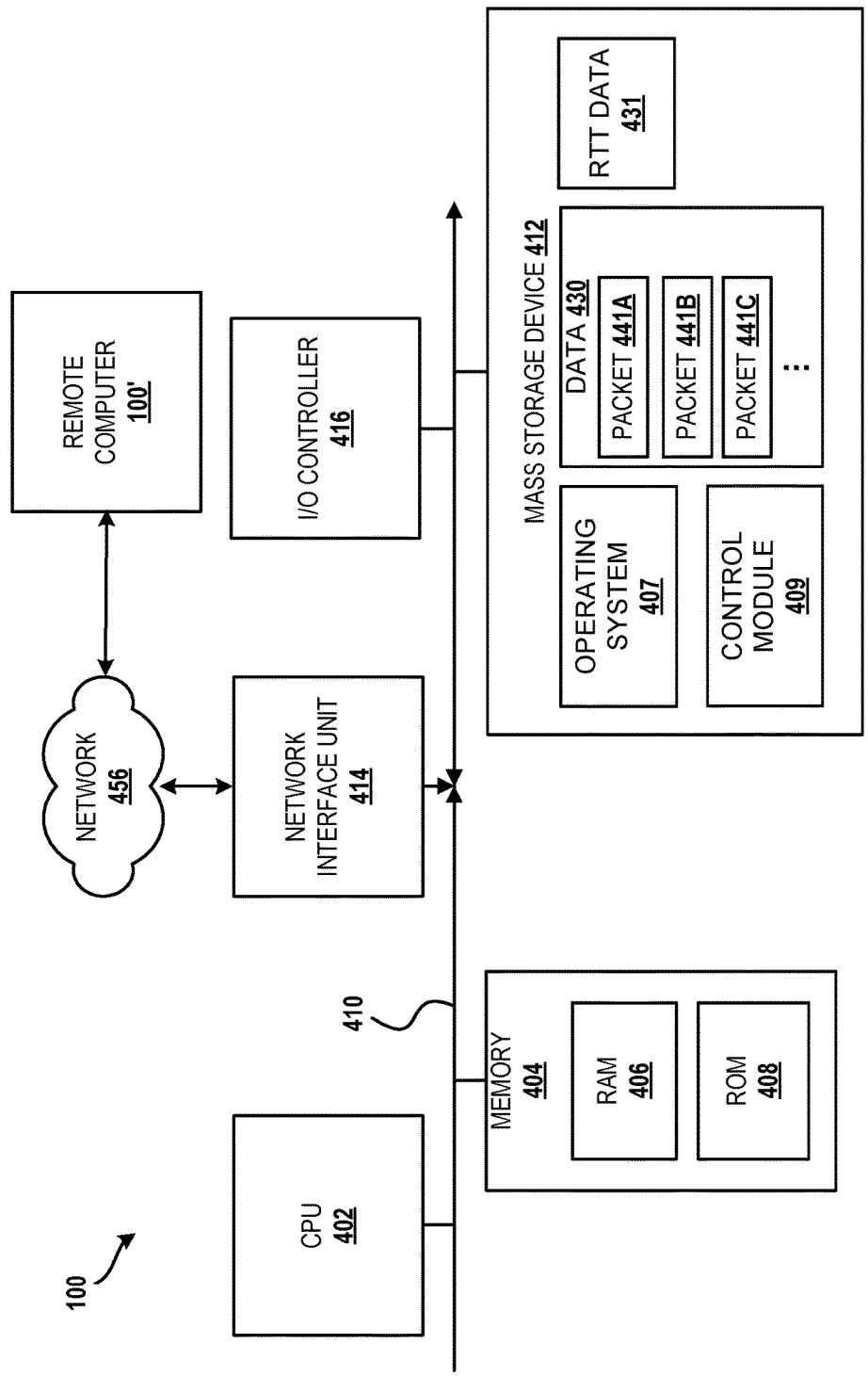
FIG. 4 is a computer architecture diagram illustrating an illustrative computer hardware and software architecture for a computing system capable of implementing aspects of the techniques and technologies presented herein.

FIG. 4 shows additional details of an example computer architecture for a computer, such as the first computing device 100 and the second computing device 100' of FIG. 1, capable of executing the program components described above. Thus, the computer architecture 100 illustrated in FIG. 4 illustrates an architecture for a server computer, mobile phone, a PDA, a smart phone, a desktop computer, a netbook computer, a tablet computer, and/or a laptop computer. The computer architecture 100 may be utilized to execute any aspects of the software components presented herein.

The computer architecture 100 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 100, such as during startup, is stored in the ROM 408. The computer architecture 100 further includes a mass storage device 412 for storing an operating system 407, one or more application programs, and other data 430 that may be communicated between computers, and acknowledgment data 431.

The mass storage device 412 is connected to the CPU 402 through a mass storage controller (not shown) connected to the bus 410. The mass storage device 412 and its associated computer-readable media provide non-volatile storage for the computer architecture 100. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 100. For purposes the claims, the phrase "computer storage medium," "computer-readable storage medium" and variations thereof, does not include waves, signals, and/or other transitory and/or intangible communication media, per se.

According to various configurations, the computer architecture 100 may operate in a networked environment using logical connections to remote computers through the network 456 and/or another network (not shown). The computer architecture 100 may connect to the network 456 through a network interface unit 414 connected to the bus 410. It should be appreciated that the network interface unit 414 also may be utilized to connect to other types of networks and remote computer systems. The computer architecture 100 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 100 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 100 in order to store and execute the software components presented herein. It also should be appreciated that the computer architecture 100 may include other types of computing devices, including hand-held computers, embedded computer systems, personal digital assistants, and other types of computing devices known to those skilled in the art. It is also contemplated that the computer architecture 100 may not include all of the components shown in FIG. 4, may include other components that are not explicitly shown in FIG. 4, or may utilize an architecture completely different than that shown in FIG. 4.

The disclosure presented herein may be considered in view of the following clauses.

Clause A: A computer-implemented method, comprising: communicating data from a first computing device to a second computing device; receiving acknowledgement data indicating a round trip time, wherein the round trip time indicates a sum of a time in which the data is communicated from the first computing device to the second computing device and a time in which the acknowledgement data is communicated from the second computing device to the first computing device; determining a gain value when the round trip time meets a criterion, wherein the gain value is based, at least in part, on the round trip time; and communicating additional data from the first computing device to the second computing device based, at least in part, on the gain value.

Clause B: the computer-implemented method of Clause A, further comprising determining that the round trip time does not meet the criterion; and wherein determining the gain value comprises increasing a current gain value to produce the gain value in response to determining that round trip time does not meet the criterion.

Clause C: the computer-implemented method of Clauses A-B, wherein determining when the round trip time does not meet the criterion comprises determining that the round trip time is above a threshold.

Clause D: the computer-implemented method of Clauses A-C, wherein the round trip time meets the criterion when the round trip time is less than a threshold, and wherein determining the gain value comprises reducing a current gain to determine the gain value.

Clause E: the computer-implemented method of Clauses A-D, wherein the round trip time meets the criterion when the round trip time indicates a new minimum time, and wherein determining the gain value comprises reducing a current gain to determine the gain value.

Clause F: the computer-implemented method of Clauses A-E, further comprising: receiving subsequent acknowledgement data indicating a subsequent round trip time associated with the additional data, where the subsequent round trip time indicates a sum of a time in which the additional data is communicated from the first computing device to the second computing device and a time in which the subsequent acknowledgement data is communicated from the second computing device to the first computing device; determining when the subsequent round trip time meets a second criterion; increasing the gain value in response to determining when the round trip time meets the second criterion; increasing the gain value to an increased gain value in response determining when the round trip time meets the second criterion; and communicating other additional data from the first computing device to the second computing device based, at least in part, on the increased gain value.

Clause G: the computer-implemented method of Clauses A-F, wherein the subsequent round trip time meets the second criterion when the subsequent round trip time is greater than the threshold or another threshold.

Clause H: the computer-implemented method of Clauses A-G, wherein the subsequent round trip time meets the second criterion when the subsequent round trip time is greater than a threshold, and wherein the gain value is set to a value of 1 (one) in response to determining when the subsequent round trip time meets the second criterion.

Clause I: the computer-implemented method of Clauses A-H, further comprising determining a window value based, at least in part, on the gain value, wherein the window value defines a number of data packets of the data in flight between the first computing device and the second computing device, and wherein the window value does not decrease below two packets.

Clause J: the computer-implemented method of Clauses A-I, wherein the round trip time meets the criterion when the round trip time is less than a threshold, and wherein determining the gain value comprises setting the gain value to a value approximate to $1/16$.

Clause K: the computer-implemented method of Clauses A-J, wherein the threshold is a minimum delay value.

Clause L: the computer-implemented method of Clauses A-K, wherein the round trip time meets the criterion when the round trip time is a new minimum time, and wherein determining the gain value comprises setting the gain value to a value approximate to $1/16$ when the round trip time meets the criterion.

Clause M: the computer-implemented method of Clauses A-L, wherein the round trip time meets the criterion when the round trip time is less than a threshold, and wherein the gain value is based, at least in part, on an equation comprising 1/min (16, CEIL (2*TARGET/base)), wherein CEIL (X) is defined as a smallest integer larger than X.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. computer-implemented method, comprising: communicating data from a first computing device to a second computing device, wherein a rate in which the data is communicated is based on a current gain value; receiving acknowledgement data indicating a round trip time, wherein the round trip time indicates a sum of a time in which the data is communicated from the first computing device to the second computing device and a time in which the acknowledgement data is communicated from the second computing device to the first computing device; determining when the round trip time indicates a new minimum round trip time that is lower than a previous minimum round trip time; in response to determining that the round trip time indicates the new minimum round trip time that is lower than the previous minimum round trip time, determining a new gain value by reducing the current gain value, wherein the new gain value is based, at least in part, on the round trip time; and transmitting additional data from the first computing device to the second computing device, wherein a rate in which the additional data is transmitted from the first computing device to the second computing device is based, at least in part, on the new gain value.

2. The computer-implemented method of claim 1, further comprising: receiving subsequent acknowledgement data indicating a subsequent round trip time associated with the additional data, the subsequent round trip time indicating a sum of a time in which the additional data is communicated from the first computing device to the second computing device and a time in which the subsequent acknowledgement data is communicated from the second computing device to the first computing device; determining when the subsequent round trip time meets a second criterion; increasing the gain value in response to determining when the round trip time meets the second criterion; increasing the gain value to an increased gain value in response determining when the round trip time meets the second criterion; and transmitting other additional data from the first computing device to the second computing device, wherein a rate in which the other additional data is transmitted from the first computing device to the second computing device based, at least in part, on the increased gain value.

3. The computer-implemented method of claim 2, wherein the subsequent round trip time meets the second criterion when the subsequent round trip time is greater than a threshold.

4. The computer-implemented method of claim 2, wherein the subsequent round trip time meets the second criterion when the subsequent round trip time is greater than a threshold, and wherein the gain value is set to a value of 1 (one) in response to determining when the subsequent round trip time meets the second criterion.

5. The computer-implemented method of claim 1, further comprising determining a window value based, at least in part, on the gain value, wherein the window value defines a number of data packets of the data in flight between the first computing device and the second computing device.

6. The computer-implemented method of claim 1, wherein the round trip time meets a criterion when the round trip time is less than a threshold, and wherein determining the gain value comprises setting the gain value to a value approximate to $1/16$.

7. The computer-implemented method of claim 6, wherein the threshold is a minimum delay value.

8. The computer-implemented method of claim 1, wherein determining the gain value comprises setting the gain value to a value approximate to $1/16$ when the round trip time meets a criterion.

9. The computer-implemented method of claim 1, wherein the round trip time meets a criterion when the round trip time is less than a threshold, and wherein the gain value is based, at least in part, on an equation comprising 1 / a minimum round trip time (16, CEIL (2* a predetermined TARGET value / a predetermined base value)), wherein CEIL(X) is defined as a smallest integer larger than X.

10. A system, comprising: a processor; and a memory in communication with the processor, the memory having computer-readable instructions stored thereupon that, when executed by the processor, cause the system to communicate data from the system to a remote computing device; receive acknowledgement data indicating a round trip time, wherein the round trip time includes a time in which the data is communicated from the system to the remote computing device and a time in which the acknowledgement data is communicated from the remote computing device to the system; determine that the round trip time indicates a new minimum round trip time that is lower than a previous minimum round trip time; in response to determining that the round trip time indicates the new minimum round trip time that is lower than the previous minimum round trip time, determine a new gain value, wherein the gain value is based, at least in part, on the round trip time, and wherein the new gain value is less than the current gain value; and transmit additional data from the system to the remote computing device, wherein a rate in which the additional data is transmitted from the system to the remote device based, at least in part, on the new gain value.

11. The system of claim 10, wherein the instructions cause the system to: receive subsequent acknowledgement data indicating a subsequent round trip time associated with the additional data, the subsequent round trip time indicating a sum of a time in which the additional data is communicated from the first computing device to the second computing device and a time in which the subsequent acknowledgement data is communicated from the second computing device to the first computing device; determine when the subsequent round trip time is greater than a threshold; increase the gain value to an increased gain value in response to determining when the subsequent round trip time is greater than the threshold; and transmit other additional data from the first computing device to the second computing device based, at least in part, on the increased gain value.

12. The system of claim 11, wherein the increased gain value is set to a value of 1(one) in response to determining when the subsequent round trip time is greater than the threshold.

13. The system of claim 10, wherein the round trip time meets a criterion when the round trip time is less than a threshold, and wherein determining the gain value comprises setting the gain value to a value of $1/16$ when the round trip time meets the criterion.

14. A computer-readable storage medium having computer-executable instructions stored thereupon which, when executed by a one or more processors of a first computing device, cause the first computing device to: communicate data from the first computing device to a second computing device based on a current gain value; receive acknowledgement data indicating a round trip time, wherein the round trip time includes a time in which the data is communicated from the first computing device to the second computing device and a time in which the acknowledgement data is communicated from the second computing device to the first computing device; determine that the round trip time indicates a new minimum round trip time; in response to determining that the round trip time indicates the new minimum round trip time that is lower than the previous minimum round trip time, decrease the current gain value to determine a new gain value; and transmit additional data from the first computing device to the second computing device, wherein a rate in which the additional data is transmitted from the first computing device to the second computing device is based, at least in part, on the new gain value.

15. The computer-readable storage medium of claim 14, wherein the instructions further cause the first computing device to increase the current gain value to determine the new gain value when the round trip time is above a threshold.

16. The computer-readable storage medium of claim 14, wherein the new gain value is set to a value of approximately 1/16 when the round trip time is below the threshold.

17. The computer-implemented method of claim 1, further comprising determining a window value based, at least in part, on the gain value, wherein the window value defines a number of data packets of the data in flight between the first computing device and the second computing device, and wherein the window value does not decrease below two packets.

18. The computer-implemented method of claim 1, wherein communicating the data from the first computing device to the second computing device is initiated using an initial window rate defining a number of data packets of the data in flight between the first computing device and the second computing device, wherein the initial window rate is limited to at least two packets.

19. The computer-implemented method of claim 1, further comprising: determining that the round trip time is below a threshold; and increasing the rate in response to determining that the round trip time is below the threshold.

20. The computer-implemented method of claim 1, further comprising: determine when a packet of the data is lost; and in response to determining when the packet of the data is lost, pause the communication of the data from the first computing device to the second computing device for a predetermined time period, wherein the predetermined time period is based, at least in part, on the round trip time.

* * * * *